US009693569B2

(12) United States Patent
Wingerd et al.

(10) Patent No.: US 9,693,569 B2
(45) Date of Patent: Jul. 4, 2017

(54) SMOKE GENERATOR

(71) Applicant: Smokehouse Products, LLC, Carson, WA (US)

(72) Inventors: Timothy E. Wingerd, Hood River, OR (US); Homer W. Lindsey, Lyle, WA (US); Richard Furrow, Hood River, OR (US); Edward J. Farrell, Cook, WA (US)

(73) Assignee: Smokehouse Products, LLC, Hood River, OR (US)

( * ) Notice: Subject to any disclaimer, the term of this patent is extended or adjusted under 35 U.S.C. 154(b) by 890 days.

(21) Appl. No.: 14/045,703

(22) Filed: Oct. 3, 2013

(65) Prior Publication Data

US 2015/0096448 A1    Apr. 9, 2015

(51) Int. Cl.
*A47J 37/00* (2006.01)
*A23B 4/052* (2006.01)

(52) U.S. Cl.
CPC .................... *A23B 4/052* (2013.01)

(58) Field of Classification Search
CPC .............................. A23B 4/052; A23B 4/0523
USPC ................................. 99/482, 480, 467, 340
See application file for complete search history.

(56) References Cited

U.S. PATENT DOCUMENTS

| 2,246,804 A | 6/1941 | Lipschutz |
| 3,788,301 A | 1/1974 | Terry |
| 4,232,597 A | 11/1980 | Perrine et al. |
| 4,270,464 A * | 6/1981 | Kerres ................. A23B 4/0523 110/118 |
| 4,810,510 A | 3/1989 | Lever et al. |
| 5,138,939 A * | 8/1992 | Bradley ................. A23B 4/052 126/59.5 |
| 5,972,401 A * | 10/1999 | Kowalski ............... A23B 4/044 426/314 |
| 6,481,344 B1 | 11/2002 | Green |
| 6,705,213 B1 | 3/2004 | Thomas |
| 6,971,305 B1 | 12/2005 | Thomas |
| 7,681,493 B2 | 3/2010 | Moore |
| 7,757,604 B2 | 7/2010 | Gonzalez |
| 2002/0106428 A1 | 8/2002 | Szyjkowski |
| 2004/0226550 A1 | 11/2004 | Hutton et al. |
| 2007/0137503 A1 | 6/2007 | Traeger et al. |
| 2008/0223224 A1* | 9/2008 | Martin ................... A23B 4/048 99/482 |
| 2009/0136638 A1 | 5/2009 | Fujie et al. |
| 2009/0293860 A1 | 12/2009 | Carlson |

(Continued)

OTHER PUBLICATIONS

Smoke Pistol product packaging, prior to Aug. 3, 2012, U.S. Retail Market.

(Continued)

*Primary Examiner* — Omar Flores Sanchez
(74) *Attorney, Agent, or Firm* — Chernoff Vilhauer McClung & Stenzel, LLP

(57) ABSTRACT

A smoke generator for providing smoke to a food smoking cabinet includes an upright enclosure with a fuel storage area located above a combustion chamber. An operating rod assembly including an operating rod, partition, and fuel agitator extend downwardly into the pellet fuel storage area. The operating rod may be manipulated from outside the enclosure to operate the agitator and selectively reposition the partition and relocate the agitator within the fuel storage area of the enclosure.

6 Claims, 2 Drawing Sheets

(56) References Cited

U.S. PATENT DOCUMENTS

2015/0079251 A1\* 3/2015 Parrish .................. A23B 4/052
426/314
2015/0132456 A1\* 5/2015 Cohen .................... A23B 4/044
426/312

OTHER PUBLICATIONS

"Smoke Pistol Instructions," undated.
"About Your Outcooker Smoke Pistol" 2003-2009.
"Smoke Pistol Accessories/Smoke Pistol Cartridges" 2003-2009.
"Smokehouse 2011 Retail Product Prices" Feb. 18, 2011.
"Bradley Smoke Generator" 2012.
Jim Beam 4 Rack Digital Smoker.

\* cited by examiner

SMOKE GENERATOR

CROSS-REFERENCE TO RELATED APPLICATIONS

None.

BACKGROUND

This invention relates to pellet fueled smoke generators that may be used to supply smoke to a smoker cabinet or a BBQ unit to flavor or preserve food. Although many food smokers have a smoke source within the cabinet, such as disclosed in U.S. Pat. No. 4,810,510 and patent application Ser. No. 12/432,568, other smokers use external wood pellet fueled smoke generators to supply smoke to a food-containing smoker cabinet. Examples of such external smoke generators are described in U.S. Pat. Nos. 7,681,493; 6,705,213; 4,232,597; and 3,788,3201; and U.S. patent application Ser. No. 11/303,405. Smoke from wood fuel pellets includes carbon dioxide, water vapor and creosote. It is the creosote which imparts the smoky flavor to the food and helps to preserve the food. Some of the smoke generators listed above employ hoppers to store the fuel pellets above the combustion area such that the pellets will fall from the hopper into the combustion area. Several disadvantages are associated with this arrangement. As smoke rises from the fuel combustion area into the pellet storage hopper, creosote is deposited on the cool walls of the hopper. On occasion the pellets will form a bridging matrix that prevents pellets from falling into the combustion area.

The present invention discloses an improved apparatus for generating smoke for food preservation and flavor from wood based fuel pellets. The apparatus includes an enclosure having a fuel storage area and a combustion chamber. An operating rod extends into the fuel storage area and is attached to a movable partition dividing the fuel storage area and/or movable fuel agitator.

DETAILED DESCRIPTION OF THE EXEMPLARY EMBODIMENT

Figures 1, 2:
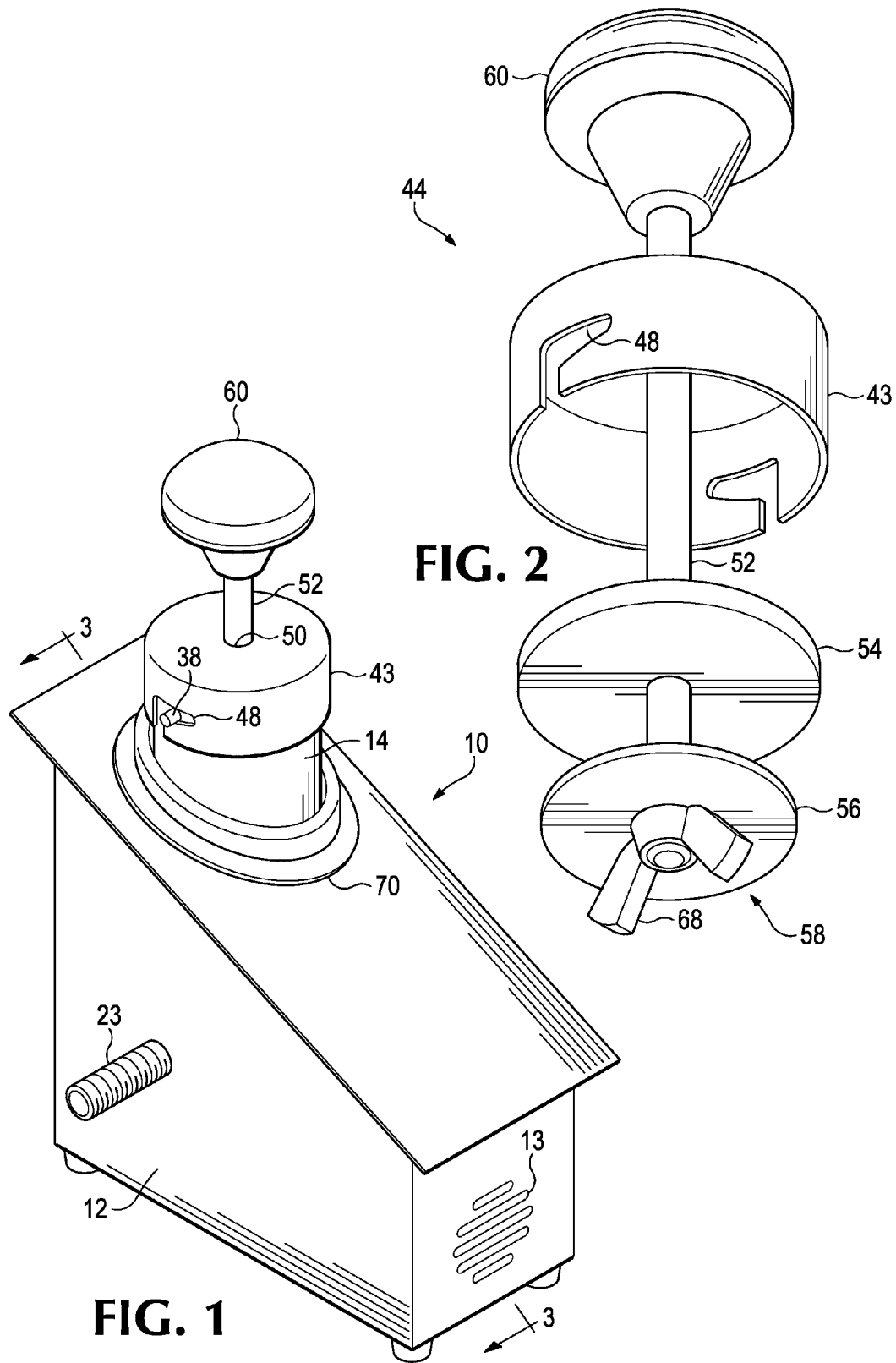
FIG. 1 is a perspective view of an exemplary smoke generator of the present invention.
FIG. 2 is a perspective view of the cap and operating rod assembly of the exemplary embodiment.
Figure 3:
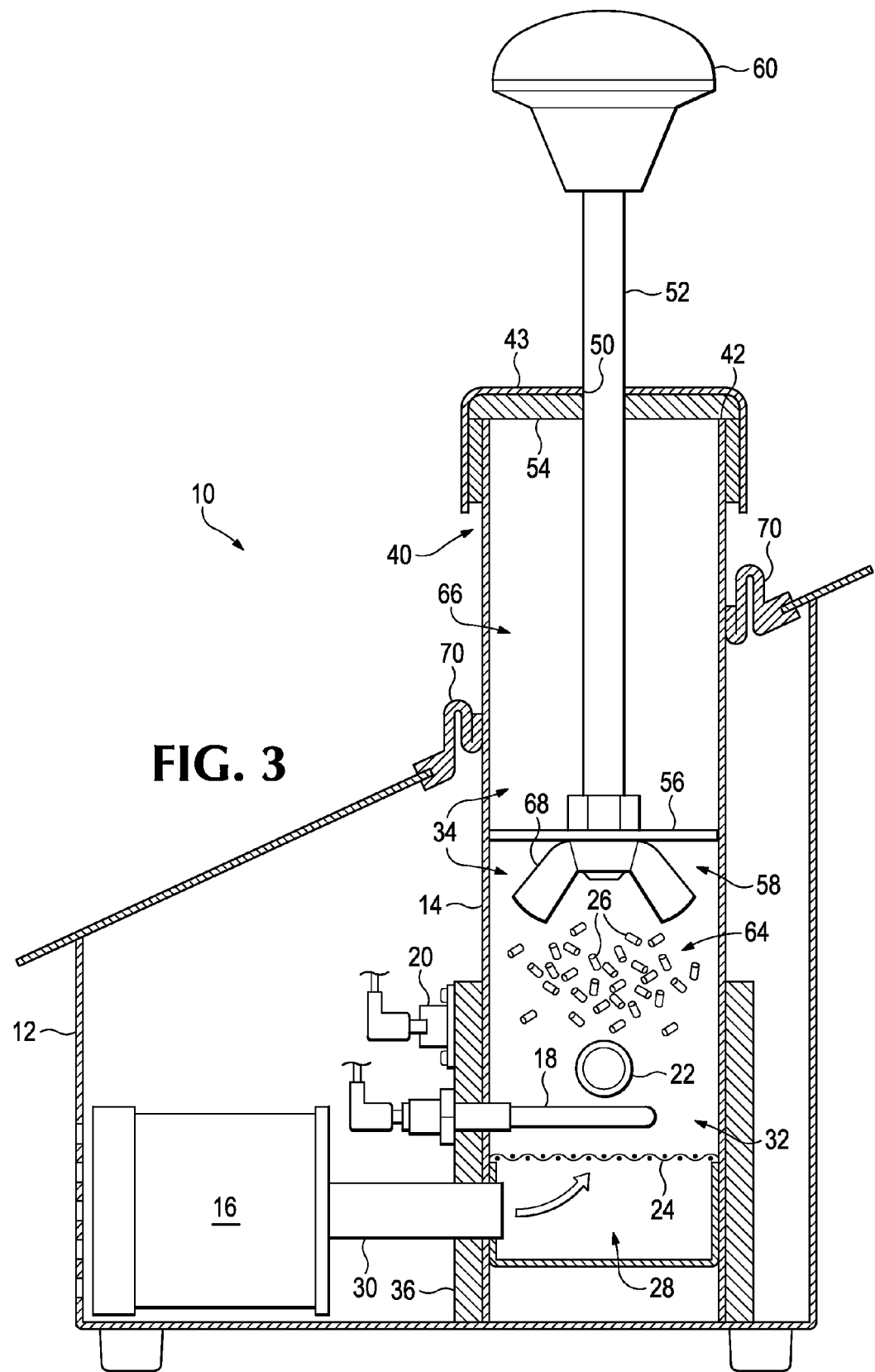
FIG. 3 is a partial sectional view of the smoke generator of FIG. 1 along lines 3-3 of FIG. 1.

Referring to FIGS. 1 and 3, an exemplary embodiment of the smoke generator 10 includes a housing 12, a combustion and fuel storage enclosure 14, a blower 16, a heating element 18, and a thermostat 20. The housing 12 includes vents 13 to permit air to enter the housing. A smoke pipe 23 extends through a sidewall of the housing 12.

The combustion and fuel storage enclosure 14 includes a screen 24 for supporting fuel pellets 26 above an air chamber 28. An opening in the lower part of the enclosure 14 accommodates a passageway 30 from the blower 16 to the air chamber 28 a heating element 18 and a smoke outlet 22. A smoke pipe 23 carries smoke from the smoke outlet to a smoker cabinet or the like. The portion of the enclosure 14 above the screen 24 and in the vicinity of the heating element 18 and smoke outlet 22 is the combustion chamber 32. The fuel storage area 34 is generally the entire enclosure 14 above the smoke outlet 22. A sleeve 36 supports the enclosure 14 within the housing 12 and acts as a heat sink to dissipate the heat generated in the combustion chamber 32. Preferably the enclosure and sleeve are of non-combustible material such as metal. The thermostat 20 is attached to and in thermal connection with the sleeve 36. The uppermost portion of the enclosure 14 includes exterior lugs 38 for use in securely closing the top 40 of the enclosure as will be described below. The top 40 of the enclosure 14 defines an opening 42 through which fuel pellets 26 may be deposited into the enclosure. A collar 70 of heat resistant material prevents material such as ash dust and pellets from entering housing 12.

Turning to FIG. 2, a cap 43 and an operating rod assembly 44 is shown. The cap 43 serves as a cover to close the opening 42 at the top 40 of the enclosure 14. The cap 43 includes L-shaped slots 48 to receive and engage the lugs 38 to securely close the top 40 enclosure 14. A resilient gasket 54 preferably of a rubber-like material fits against the underside of the cap. The cap 43 includes a central aperture 50 through which extends an elongate operating rod 52. The gasket 54 also includes a corresponding central aperture through which passes the operating rod 52. The operating rod assembly 44 includes a partition 56 and fuel agitator 58 which are attached to the lower end of the operating rod 52. In the exemplary embodiment, the partition 56 closely matches the interior of the enclosure 14. A knob 60 on the upper end of rod 52 facilitates manipulation of the rod to provide axial and rotational movement of the rod 52.

In the exemplary embodiment, the metal enclosure 14 conducts heat to the sleeve 36 to which the thermostat 20 is thermally coupled. If the temperature of the sleeve 36 proximate to the thermostat 20 falls below 185° F., the heating element 18, such as a glow plug, is activated. In the preferred embodiment, the blower 16 continuously forces air through the passageway 30 into the air chamber 28 at the bottom of the enclosure and upwardly into the combustion chamber 32.

Fuel in the form of compressed wood fiber pellets 26 in the exemplary embodiment is loaded into the enclosure 14 through opening 42 at the top of the enclosure. The fuel pellets fall into the combustion chamber 32, where they are supported on the screen 24 in the vicinity of the heating element 18. Preferably only an appropriate amount of fuel pellets is loaded into the enclosure 14 to accomplish the smoking at hand. While it is possible to fill the enclosure 14 to the top, it is not necessary to do so for each use.

Engaging the lugs 38 with the L-shaped slots 48 in the cap 46 and twisting the cap creates a substantially air-tight seal because the resilient gasket 54 is compressed between the edge 62 of the opening 42 and the underside of the cap 46. The gasket 54 tightly surrounds the operating rod 52 where the rod passes through the gasket to prevent free passage of air into and out of the enclosure 14. In the exemplary embodiment, the operating rod 52 is straight, defining an axis, and pushing or pulling on the knob 60 moves the rod and the attached partition 56 and agitator 58 along the rod's axis. Pushing down on the knob 60 moves the operating rod 52, partition 56 and agitator 58 into a position where the agitator 58 extends down into the fuel pellets 26 and the partition 56 is directly above the fuel pellets 26, partitioning the fuel storage area 34 into a fuel-containing portion 64 and a fuel-free portion 66. The size of these portions 64 and 66 will vary depending upon the amount of fuel in the enclosure 14 and the position of the partition 56.

When the smoke generator is loaded with wood pellets as described above and connected to a power source, the glow plug 18 heats up and air from the blower 16 flows upwardly from the air chamber 28 through the screen 24 into the combustion chamber 32. The wood pellets in the vicinity of the heating element ignite and generate smoke which exits the combustion chamber through the smoke outlet 22 and smoke pipe 23. The relatively small size of the smoke outlet 22 restricts the air flow through the combustion chamber, providing sufficient air flow to enable smoldering combustion of the fuel pellets, but discouraging vigorous combustion. Although smoke also fills the fuel containing portion 64 of the enclosure 14, the placement of the partition 56 confines the size of this area to that necessary accommodate the volume of the fuel pellets 26. The smoke is confined to the heated fuel-containing portion 64 of the storage area and does not contact the cooler walls of the fuel-free portion 66, discouraging formation of creosote deposits on the enclosure walls.

The partition 56 conforms closely to the inner dimensions of the enclosure 14 shielding the resilient gasket 54—which is preferably made of heat resistant material—from unnecessary heat which would degrade the material of the gasket and impair the seal.

If the pellets 26 form a bridging matrix and do not freely fall into the combustion chamber 32, rotation of the operating rod 52 by manipulating the knob 60 will move the agitator arms 68 which extend radially outwardly from the axis of the operating rod 52. Movement of the agitator arms 68 stirs the fuel pellets 26, breaking up any bridging matrix and causing the pellets to fall into the combustion chamber 32. While the agitator 58 is shown in the exemplary embodiment as a simple wing nut, an agitator may be of any shape and size sufficient to move the fuel pellets when the operating rod 52 is manipulated.

If the fuel pellets 26 have burned sufficiently such that the level of pellets within the enclosure 14 has fallen out of contact with the agitator 58, the operating rod 52 may be moved downwards until the agitator is again in contact with the pellets.

When operational, the smoke generator 10 is preferably positioned next to a smoker cabinet or the like with the smoke pipe 23 extending into the cabinet (not shown). The smoke pipe 23 may be threaded, in which case a nut may be used to engage the threads and secure the smoke generator 10 to the cabinet. A bracket, not shown, may also be used to support and secure the smoker generator to a cabinet or the like.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow. For example, the enclosure does not need to be in the shape of a vertically orientated cylinder nor does the fuel storage area have to be directly above or the same shape as the combustion chamber. Any arrangement which enables the fuel pellets to be drawn by gravity into the combustion chamber is within the scope of the invention. The operating rod may be of any shape or configuration as long as it is capable of either moving the shield or moving the agitator from outside the enclosure.

What is claimed is:

1. A smoke generator comprising a combustion and fuel storage enclosure including a combustion chamber and a fuel storage area configured so as to enable fuel in said fuel storage area to be drawn by gravity into said combustion chamber; said fuel storage area divided by a movable partition into a fuel containing portion and a fuel-free portion; an operating member extending into said fuel storage area from outside said fuel storage area and operable from outside said fuel storage area to selectively reposition said partition within said fuel storage area; wherein said operating member is elongate defining an axis, and is operatively connected to said partition to move said partition in first and second directions along said axis.

2. The smoke generator of claim 1 including a fuel agitator operatively connected to said operating member such that movement of said operating member along said axis relocates said agitator within said fuel storage area.

3. The smoke generator of claim 2 wherein movement of said operating member about said axis rotates said agitator.

4. The smoke generator of claim 2 wherein said operating member includes at least one arm extending radially outwardly from said axis.

5. A smoke generator, comprising:
   a combustion and fuel storage enclosure including a combustion chamber and a fuel storage area configured so as to enable fuel in said fuel storage area to be drawn by gravity into said combustion chamber, said fuel storage area divided by a movable partition into a fuel containing portion and a fuel-free portion,
   wherein said fuel storage area includes an opening to enable fuel to be placed in said fuel storage area, a cover to close said opening and a resilient seal positioned between said cover and said opening to substantially prevent air flow through said opening.

6. In a smoke generator having an enclosure defining a fuel storage area, an operating rod assembly including a fuel agitator operatively associated with an operating rod, said operating rod selectively movable to relocate said fuel agitator within said fuel storage area and further including a partition operatively associated with said operating rod and selectively movable within said fuel storage area to divide said fuel storage area into compartments.

* * * * *